Sept. 27, 1960  C. E. HOLTZ ET AL  2,953,842
METHOD OF MAKING TABBED HEATER
Filed June 28, 1954  5 Sheets-Sheet 1

INVENTORS
CHARLES E. HOLTZ
HENRY W. ROEBER
BY
Michael Hertz
ATTORNEY

Sept. 27, 1960  C. E. HOLTZ ET AL  2,953,842
METHOD OF MAKING TABBED HEATER
Filed June 28, 1954  5 Sheets-Sheet 2
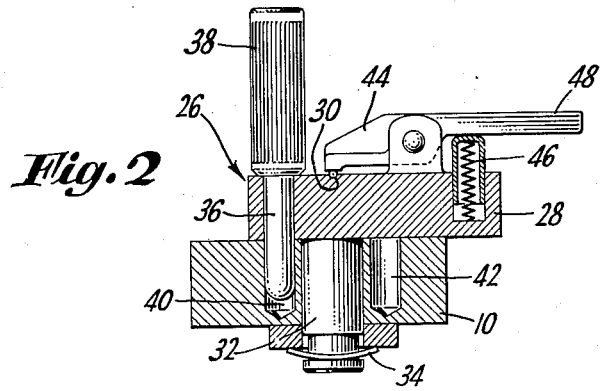
Fig. 2
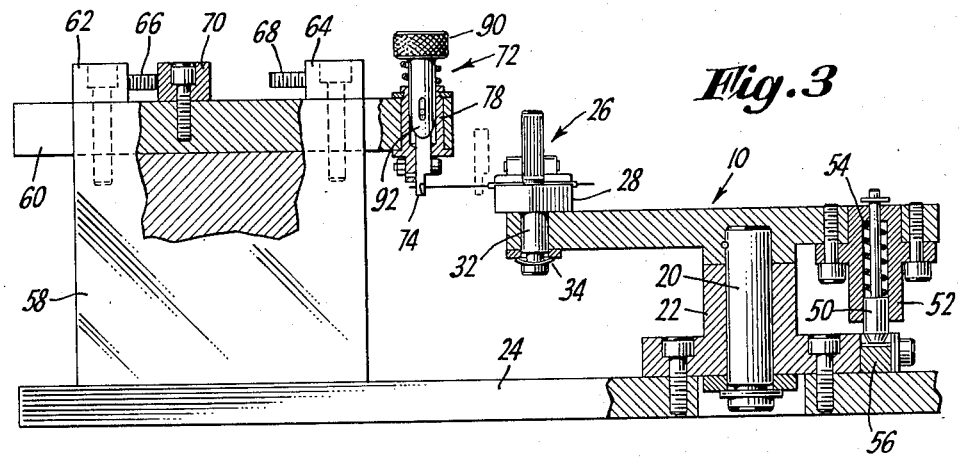
Fig. 3
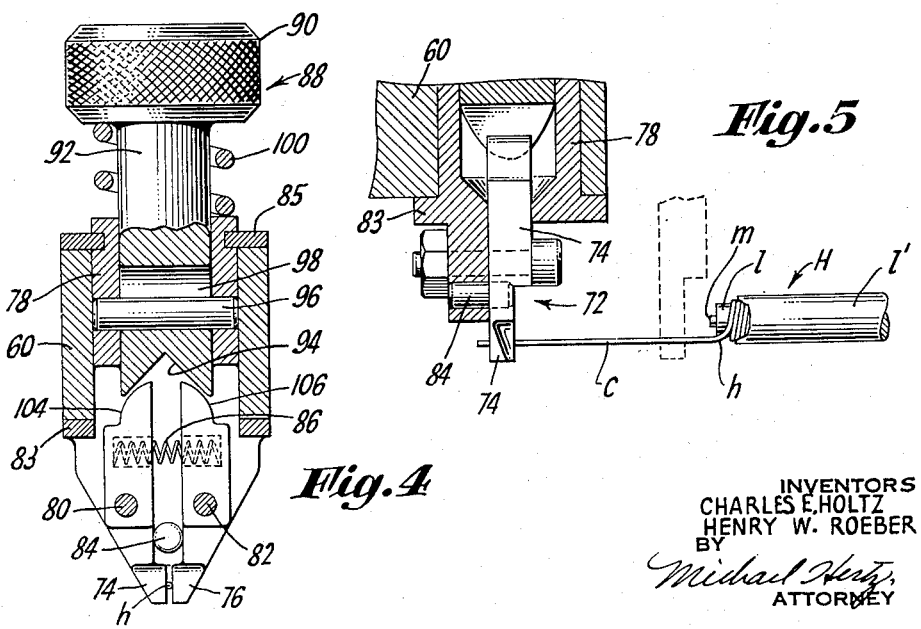
Fig. 5
Fig. 4
INVENTORS
CHARLES E. HOLTZ
HENRY W. ROEBER
BY
Michael Hertz
ATTORNEY

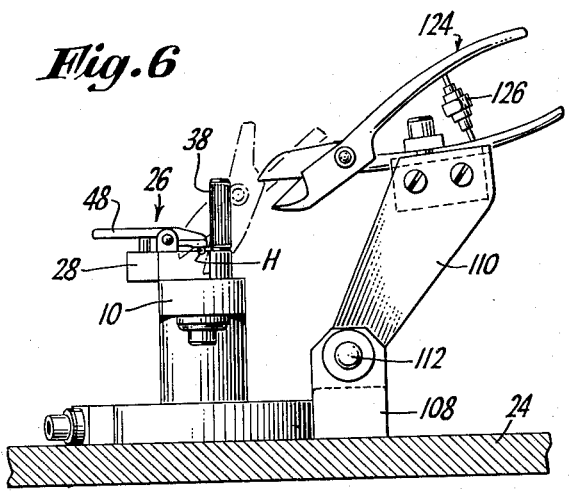
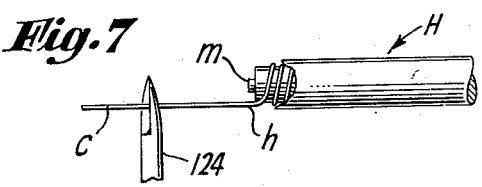
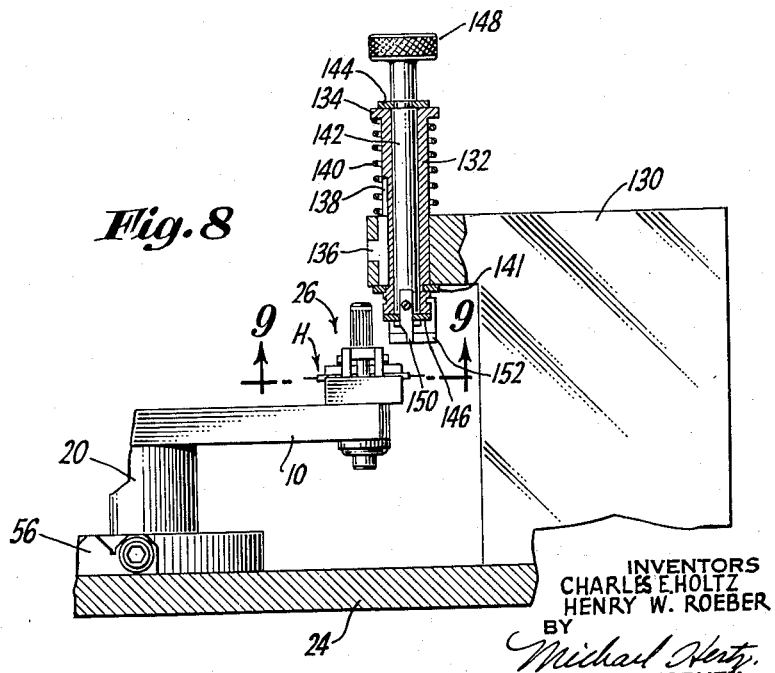

Sept. 27, 1960 C. E. HOLTZ ET AL 2,953,842
METHOD OF MAKING TABBED HEATER
Filed June 28, 1954 5 Sheets-Sheet 4

INVENTORS
CHARLES E. HOLTZ
HENRY W. ROEBER
BY
ATTORNEY

Sept. 27, 1960 C. E. HOLTZ ET AL 2,953,842
METHOD OF MAKING TABBED HEATER
Filed June 28, 1954 5 Sheets-Sheet 5
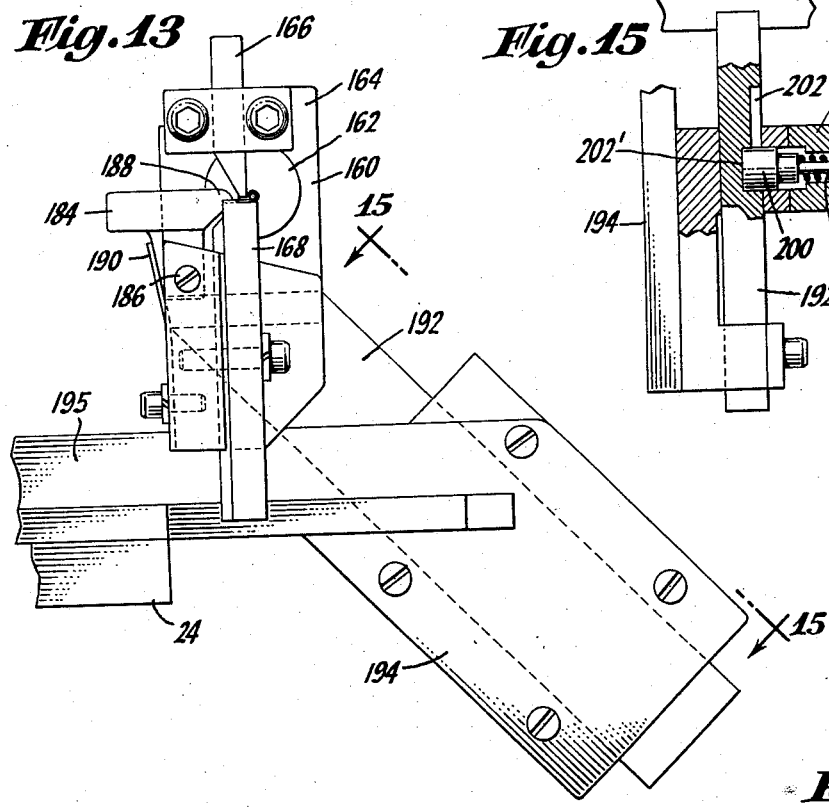
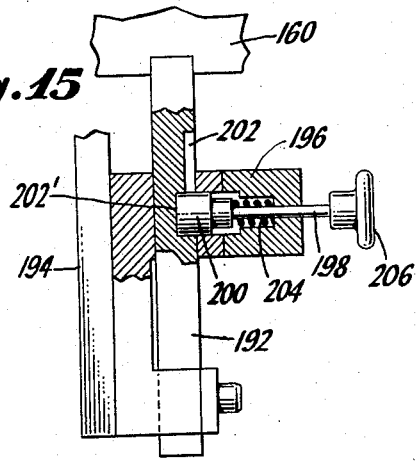
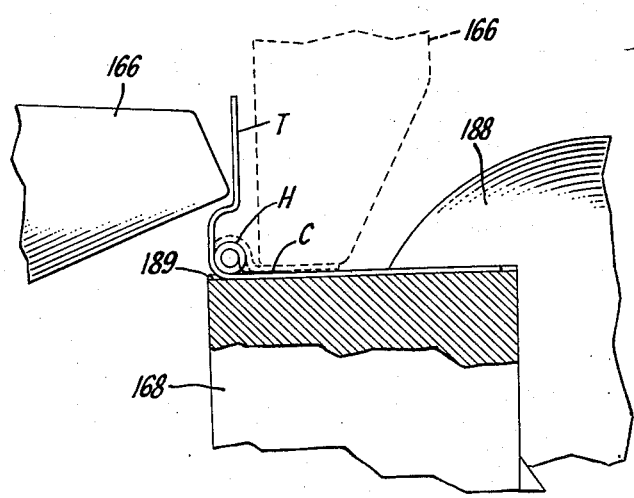
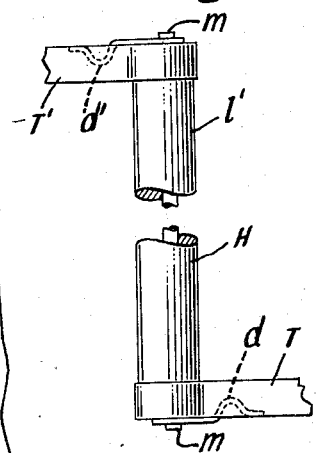
INVENTORS
CHARLES E. HOLTZ
HENRY W. ROEBER
BY
Michael Herzig
ATTORNEY 2,953,842
Patented Sept. 27, 1960

2,953,842
METHOD OF MAKING TABBED HEATER

Charles E. Holtz, Lakewood, Calif., and Henry W. Roeber, Emporium, Pa., assignors, by mesne assignments, to Sylvania Electric Products Inc., Wilmington, Del., a corporation of Delaware Filed June 28, 1954, Ser. No. 439,642

9 Claims. (Cl. 29—155.55)

The present invention relates to a process and apparatus for manufacturing heaters for cathodes of electron discharge devices, and to such heaters as products. In particular, the present invention contemplates progressive processing of a heater wire wound on a support and embedded between insulating layers to provide one or more exposed contact parts of definite length, to bend these ends to suitable shape and at right angles to the wound heater wire and to unfold these ends within tab members to which the ends are welded. In the mass production of heater elements for vacuum tubes, it is desirable to employ construction techniques compatible with the requirements of low cost and to overcome the rather delicate and often tedious operations incident to handling small and fragile heater components, such as the heater wire and the tab members employed to connect the heater wire to a conductor in an electron tube. In one type of heater construction a wire coated with a layer of refractory material serves as a mandrel on which is wound a helix of fine tungsten resistance wire with the desired number of turns per inch. The wound heater wire is coated with a further layer of refractory material, provision being made for the connection of contacts or tab members to the terminal ends of the heater wire. Prior to assembly within the cathode sleeve of an electron tube, the wound heater wire is folded back upon itself, as, medially of its length, to bring both tab members together to extend from the same end of the cathode sleeve when mounted therein. In this type of construction there are instances where the wire support is approximately ten thousandths of an inch in diameter and the heater winding has a diameter which is a fraction of that. The winding may have a pitch of one five hundredth to one eight hundredth of an inch. The overall length of the wound heater, prior to folding, often does not exceed an inch and a half or two. It will then be apparent that grave difficulties in routine handling are encountered. Especially so is the permanent and proper connection to each end of the heater wire of tab members of comparable size.

Accordingly, it is an object of the present invention to provide a novel method of tabbing heaters for vacuum tubes. Another object of this invention is to provide an improved process for conductively connecting tab members to the opposite free ends of a wound and insulated heater wire, resulting in a rugged heater construction and good electrical contacts between the tab members and the terminal ends of the heating wire.

Other objects and advantages of the invention will become clear after consideration of the following detailed description, when taken in conjunction with the drawings, wherein:

Fig. 2 is an enlarged sectional view along the line 2—2 of Fig. 1 showing the details of a heater clamping chuck supported on the turret bar;

Fig. 3 is an enlarged sectional view with the turret bar indexed to the vertical plane of a wire pulling station;

Fig. 4 is an enlarged fragmentary sectional view through a pulling head at the wire-pulling station;

Fig. 5 is an enlarged fragmentary sectional view showing the wire-pulling head in engagement with the heater wire and displaced outwardly from a starting position, illustrated roughly in dotted lines;

Fig. 6 is an elevational view partly in section, taken along the line 6—6 of Fig. 1 and showing details at a wire-cutting station;

Fig. 7 is an enlarged fragmentary plan view showing the wire-cutting head of the station of Fig. 6 in position to cut the freed heater wire to a prescribed length;

Fig. 8 is an enlarged fragmentary sectional view showing the details of mechanism at a wire-forming and hooking station;

Fig. 13 is an elevational view taken along the line 13—13 of Fig. 12;

Fig. 14 is an enlarged fragmentary view showing the tab member in position partially surrounding an end of the composite heater with a movable welding and clamping jaw in position prior to a welding operation, the final position of the upstanding end of the tab and of the welding and clamping jaw being shown in dotted lines;

Fig. 15 is a fragmentary elevational view taken along the line 15—15 of Fig. 13 showing mechanism for positioning the welding and clamping jaw; and Fig. 16 is a plan view with parts broken away showing the unfolded heater formed with laterally extending tab members adjacent its opposite ends.

Figure 1:
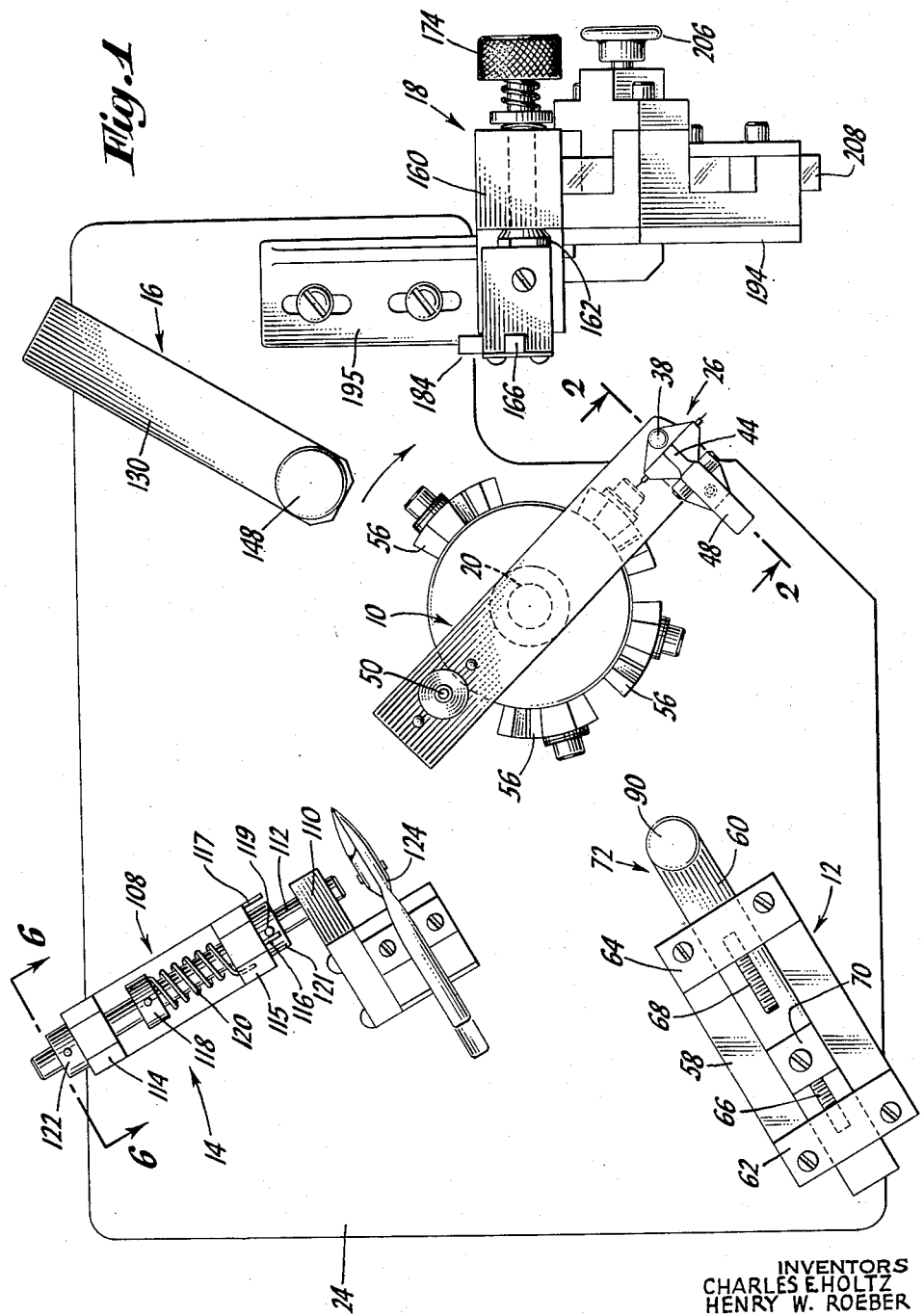
Fig. 1 is a plan view of a heater tabbing apparatus embodying features of the present invention, showing a turret bar in a loading position.

Referring now more particularly to the drawings, there is shown in Figs. 1 to 3 inclusive, a carrier or turret bar 10, which is arranged to move the heater to be tabbed along a circular feed path for sequential processing past the wire-pulling station 12, the wire-cutting station 14, the wire-forming and bending station 16, and the tab-applying and welding station 18.

The turret bar 10 is carried on an upright shaft 20 which is journaled in a bearing 22 fixed to a base or bed plate 24. The rotatable turret bar 10 supports a holder for the respective heaters, the holder being specifically illustrated as a rotatable chuck 26 mounted on one end of the turret bar 10. The chuck 26 includes a base 28 formed with an elongated longitudinally-extending groove or channel way 30 on its uppermost face which is adapted to receive a wound and insulated heater coil. The base 28 is pivoted on a depending stub shaft 32 which extends into a suitable bore provided in the turret bar 10 and is retained therein by a split spring retaining ring 34 as is common in the art. As clearly seen in Fig. 1, the overall length of the base 28 of the chuck 26 is selected so that it is somewhat smaller than the length of the heater to be processed, the heater being suported in the longitudinally extending slot 30 and projecting beyond the ends thereof. Accordingly, the chuck 26 can be rotated through 180 degrees to bring either terminal end of the heater into position for tabbing wherein such end projects beyond the outermost end of the turret bar 10. The chuck 26 carries a positioning pin 36 provided with a knurled shank 38, the positioning pin being alternatively receivable in the bores 40, 42 provided in the turret bar 10 so that either end of the wire held in the slots may extend beyond the bar 10. Any suitable clamp may be provided for maintaining the heater in the slot 30, the illustrative arrangement including a pivoted clamping head 44 biased toward a clamping position by a spring 46 and releasable by depression of a handle 48. By the provision of the rotatable chuck 26 both projecting ends of the heater may be processed without resetting the heater in the slot and by merely pulling upwardly on the handle 38 of the positioning pin 36 to free the chuck 26 for rotational displacement.

Any suitable mechanisms may be provided for locking the turret bar 10 in work positions relative to the stations 12, 14, 16 and 18 after indexing of the turret bar 10 through an arc equal to the angular displacement of the respective stations. The illustrative locking device, seen best in Fig. 3, includes a keeper 50 vertically displaceable in a housing 52 carried on the turret bar 10. It may conveniently be located at the end of the bar remote from the chuck 26. The keeper 50 is based downwardly by a spring 54, and is successively receivable within suitable upwardly-opening retaining seats 56 spaced peripherally of the bearing 22. In this manner, provision is made for locking the turret bar 10 in a fixed position relative to the respective work stations to assure uniformity in the sequential processing of a heater terminal end.

Specific reference will now be made to Figs. 3 to 5 inclusive. The heater assembly, designated generally by the letter H, includes a wire mandrel $m$ of a desired length coated with a refractory layer 1. The cylindrical support so provided carries a helically wound tungsten heater wire $h$ having the desired number of turns per inch and having short terminal ends extending in the direction of the helix. These ends can be readily grasped by a clamp or the like. The wound heater wire $h$ is further provided with an outer insulating coating 1'. The wire pulling station 12 includes a slide housing 58 (see Fig. 3) in which is mounted a slide bar 60 movable radially of the circular feed path and along an axis aligned with the supported heater H when indexed into a work position relative to the station 12. The travel of the slide bar 60 is limited by end stops. Such end stops may be provided by bars 62, 64 on the slide housing 58 carrying adjustable stop screws 66, 68 engageable with an abutment block 70 fastened to the slide bar 60. Supported on the inner end of the slide bar 60 is a wire-clamping or gripping device 72, the details of which are best seen in Fig. 4. The device 72 includes a pair of wire gripping jaws 74, 76 pivoted on a housing 78 by means of pins 80, 82. The housing is supported in the end of slide bar 60 and is retained by a lower integral collar 83 and an upper lock ring 85. Intermediate the jaws 74, 76 there is a cylindrical stop member 84 which centers the clamp and also prevents the jaws from completely closing thereby avoiding crushing of the relatively fine, fragile, heating wire $h$. Spaced above the pivots 80, 82, the jaws 74, 76 are formed with opposed recesses housing a spring 86 which normally biases the jaws toward each other. In order to, at will, spread the gripping jaws 74, 76 there is provided a depressible operating member 88 including an operating knob 90 and a depending actuator 92 formed on its lower end with an inverted V-shaped undercut 94. The operating member 88 is supported for limited longitudinal displacement relative to the housing 78 by a pin 96 which traverses a slot 98 formed through the actuator 92. The pin 96 is fixed in the housing 78 and is engageable with the upper and lowermost ends of the slot 98 to limit the travel of the operating member 88, the latter being normally biased upwardly into the position of Fig. 4 by a spring 100 encircling the pin 92 and arranged intermediate the knob 90 and the adjacent end of the housing 78. The ends of the wire-gripping jaws 74, 76 adjacent the lowermost end of the operating member 88 are provided with camming surfaces 104, 106 which are engaged by the inverted V-shaped wedging surface 94 to urge the jaws 74, 76 away from each other in response to depression of the operating member 88. From the foregoing, it can be seen that the wire-gripping jaws 74, 76 may be separated to receive a terminal end of the heater wire $h$, when the gripping device 72 is in the innermost or starting position shown in dotted lines in Fig. 5, and thereafter pulled outwardly to remove one or more turns of the wire $h$ from the mandrel $m$ to provide an exposed contact part $c$ which is to be processed for connection to a tab member, the coating 1' being of a fragile character to break away as the wire is pulled to leave the lower coating exposed, as shown in Fig. 5.

In Figs. 1, 6 and 7 the details of the wire-cutting station 14 are best seen, the mechanism at this station being arranged to sever the exposed contact part $c$ of the heater wire $h$ at a predetermined distance spaced outwardly of the turret bar 10. Specifically, the wire-cutting station 14 includes a bracket 108 carrying a tool holder 110 fixed to an oscillatable shaft 112 journaled in the bracket 108. The oscillatable shaft 112 is longitudinally displaceable between upstanding bosses 114, 115 of the bracket 108 for initial adjustment. The boss 115 carries a pair of outwardly-projecting, peripherally-spaced pins 116, 117, cooperating with a radially projecting pin 119 on a collar 121 adjustably fixed longitudinally of the swingable shaft 112 by set screws (not shown), to limit the travel of the latter between the inoperative position, illustrated by the full lines in Fig. 6, to the operative position, shown by the dotted lines. Intermediate the bosses 114, 115, the shaft 112 carries a stop collar 118 which retains one end of a torsion spring 120 having its other end fixed to the innermost boss 115. A further screw provided stop collar 122 is carried on the shaft 112 outwardly of the boss 114 and cooperates with the collar 121 to maintain initial longitudinal adjustment of the swingable shaft 112. The torsion spring normally holds the tool holder 110 at a location spaced outwardly of and above the line of travel of the turret bar 10, wherein the tool holder does not interfere with the indexing of the turret, this inoperative or retracted position being shown in Figs. 1 and 6. The severing tool itself for the sake of simplicity, is illustrated as a conventional pair of cutting pliers, generally designated by the numeral 124, including a compression spring 126 normally biasing the plier jaws into an open position. In order to cut the exposed contact part $c$ of the heater wire $h$, it is merely necessary to grasp the handle of the pliers 124, and rock the pliers into the position illustrated in dotted lines in Fig. 6, the cutting operation being completed by squeezing the handles of the pliers together.

Figure 9:
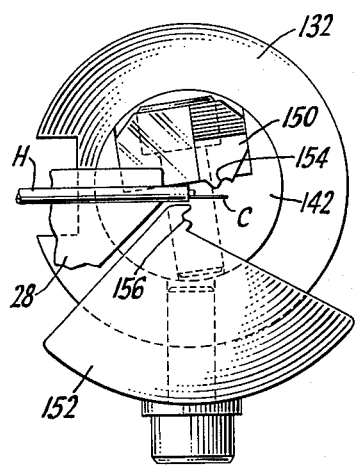
Fig. 9 is a bottom plan view taken along the line 9—9 of Fig. 8 showing wire-forming dies just prior to the bending and hooking of the freed part of the heater wire.
Figure 10:
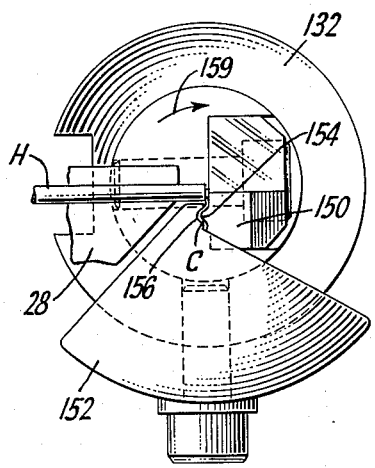
Fig. 10 is a bottom plan view taken along the line 9—9 of Fig. 8 and showing the wire-forming dies in the operative position subsequent to hooking and bending of the freed part of the heater wire.
Figure 11:
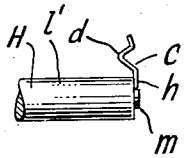
Fig. 11 is a greatly enlarged plan view of a fragmentary portion of the heater showing the freed or exposed part of the heater wire bent at right angles to the heater proper and laterally hooked for connection to a tab member.
Figure 12:
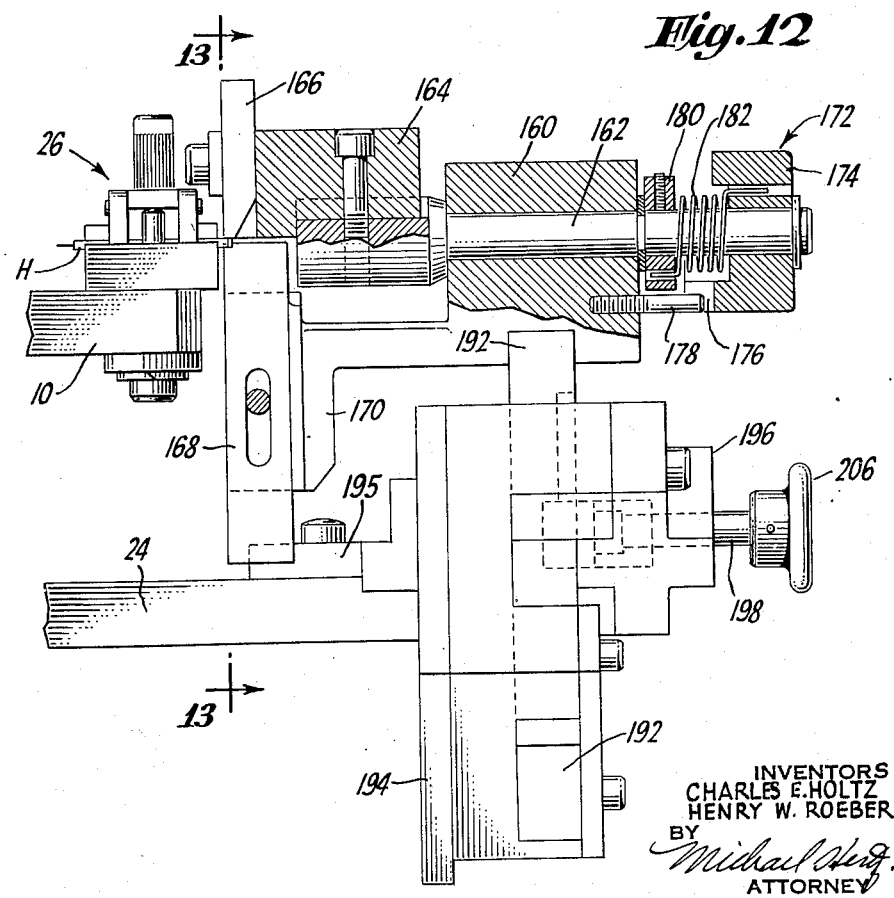
Fig. 12 is an elevational view, with parts in section, showing the details of mechanism at a tab-applying and welding station.

Referring now specifically to Figs. 8 to 11 inclusive, there is illustrated the mechanism at the wire-forming and bending station 16, this mechanism being constructed and arranged to position the contact part $c$ of the heater H for securement to the tab member. Specifically, the staiton 16 includes an upstanding tool support 130 which carries a vertically slidable tool housing 132 formed with a longitudinally extending bore, the housing being flanged adjacent its upper end to provide a stop collar 134. The travel of the housing 132 is limited by the provision of a key 136 on the support 130 extending in a slot 138 in the outer periphery of the housing 132, the slot and the key additionally serving to preclude rotation of the housing 132. Interposed between the flange 134 and the support 130 is a compression spring 140 encircling the housing 132 and urging the latter into its uppermost position, as illustrated in Fig. 8. The upward displacement of the housing is limited by the split washer 141 at the lower end of the housing. Arranged within the bore of the housing 132 is a rotatable shaft 142 which is maintained against axial displacement by the collars 144,

146. The upper end of the rotatable shaft 142 carries an operating knob 148, the lower end of the shaft being arranged to receive a movable forming and bending tool 150. Carried by and movable up and down with the housing is a cooperating forming and bending tool 152 fixed against rotation with respect to the housing and the rotatable die 150. As seen in Fig. 9, the movable tool 150 includes a male die part 154 shaped complementary to a female die part 156 on the fixed tool 152. The length of the slot 138 is selected so that upon exerting a downward pressure on the operating knob 148 against the action of the spring 140, both the movable forming and bending tool 150 and the relatively fixed tool 152 can be brought into coplanar relation with the end c of the heater wire. Upon rotation of the movable forming tool 150, as indicated by the arrow 159 (Fig. 10) the male die part 154 of the tool 150 is brought into close relationship with the female die part 156 of the tool 152 carrying the portion c of the wire to a position between the dies. Concurrent with the right angular bending of the contact part c, a predominant bend or substantial hook or U-shaped offset is formed on the contact part c as seen in Fig. 11, with the hook portion d and the free end inclining back toward the insulation 1' enabling ready and more permanent securement of the relatively thin and fragile heater wire to an appropriate contact, such as a tab member supported in part by the insulation 1', as will be explained later.

In Figs. 1 and 12 to 16 inclusive, there is shown the detailed construction of the tab-applying and welding station 18, which is arranged to apply tabs T, T' to the opposite ends of the heater assembly and to secure the laterally projecting ends of the respective tabs to the adjacent hooked or offset contacts parts d, d'. The station 18 includes a supporting head 160 which is adjustable relative the path of travel of the heater being processed, as will subsequently be described. The supporting head 160 carries a rotatable shaft 162, having the opposite ends thereof projecting beyond the head 160. On one end of the rotatable shaft 162 there is a block 164 rotatable with the shaft carrying a welding and clamping jaw 166 adapted on rotation of shaft 162 to be brought into cooperative engagement with a fixed welding and clamping jaw 168, on an arm 170 integral with the supporting head 160. On the end of the shaft 162 remote from the block 164, is an operating and positioning assembly 172 including a knob 174 spaced outwardly from the supporting head 160 and formed with a segmental arcuate cut-out 176. Projecting into this cut-out is a stop or pin 178 carried on the supporting head 160, the pin and cut-out cooperating to limit the pivotal movement of the shaft 162 and of the swingable electrode 166 carried thereby. On the shaft 162 intermediate the supporting head and the knob 174 is an adjustable collar 180 which receives one end of a torsion spring 182 encircling the shaft 162 and having its opposite end connected to the operating knob 174. The torsion spring 182 serves to normally bias the swingable welding and clamping jaw 166 into the position of Fig. 12 and in accordance with the adjustment of collar 180 controls the pressure which the jaw 166 exerts on the parts to be welded. As seen in Figs. 13 and 14, the lower or fixed welding and clamping jaw 168 is provided with a tab clamping head 184 pivoted on a pin 186 said head including a finger 188 adapted to overlie the uppermost face of the electrode 168. This uppermost face is suitably slotted at 189 to accommodate the tab members T, T' thereon in position to receive the formed contact parts d or d' of the heater H, and the insulated portion of the heater H adjacent the part d or d'. The tab clamping head 184 is biased into the position of Figs. 13 and 14 by a leaf spring 190, the tab-clamping head serving to align the tab in the grooved upper face of the fixed electrode 168 and to hold the tab members T, T' in place during the bending and welding operation.

To prevent the tab clamping and welding mechanism from interfering with the travel of the turret bar 10 through the processing cycle, the supporting head 160 is mounted on a slide bar 192, angularly disposed with respect to the vertical and which is received within a bracket 194 adjustable on the base or bed plate 24 through the intermediary of a slotted adjustable plate 195 integral with the bracket 194. The sliding arrangement of the supporting head 160 permits the entire assembly to be displaced out of the path of the turret bar 10 prior to and subsequent to movement of the bar into the work position relative to the station 18. In order to limit the travel of the head 160 and to assure arrangement of the work faces of the movable and fixed electrodes 166 and 168 in the proper plane for the heater, a positioning device is provided on the bracket 194 supporting the slide 192. Specifically, the bracket 194 is bifurcated and carries a positioning block 196 mounting a longitudinally shiftable positioning pin 198 having a head 200. The slide bar 192 has a longitudinal shallow depth slot 202 which may ride along the head 200 in the shifting movement of the bar, the slot having a recess or deeper lower end 202' shaped complementary to and receiving the head 200 to lock the slide in its upper position. The relative location of the slot 202 and its length accurately predetermines the lowermost position to which the welding and tab-applying assembly can be dropped, the deep recess 202' determining the operative position of the assembly. The positioning block 196 accommodates a spring 204 which encircles the pin 198 and normally biases the head thereof into the slot 202 and the recess 202', an operating knob 206 being provided to facilitate the outward displacement of the head 200 to free the bar 192 for movement.

A preferred processing cycle will now be described employing the illustrative mechanisms at the various work stations:

A heater H to be provided with tab terminals or contacts is mounted within the groove 30 of the chuck 26 with the opposite ends thereof projecting substantially equally beyond the chuck. Thereupon, the turret bar 10 is indexed into a work position relative to the wire-pulling station 12. At this station the terminal end of the wound heater wire h adjacent the clamp device 72 is engaged by the wire-gripping or clamping jaws 74, 76 by suitable manipulation of knob 90. In response to radial outward movement of the knob and clamping device relative to the turret bar 10, one or more turns of wire, as determined by adjustment of the stop screw 66 is pulled from between the insulating layers 1, 1' without damaging the wire. The knob is now again depressed to release the wire and the turret bar is indexed into a work position opposite the wire-cutting station 14. The contact part c formed at the wire pulling station 12 is then cut to a prescribed length by manipulation of the cutting pliers 124. The turret bar 10 is again indexed to bring the contact part c cut to the desired length into a work position opposite the wire-forming and bending station 16 whereat the contact part c is arranged in coplanar position relative to the fixed forming tool 152. The mechanisms at this station are then operated by pressing downwardly on the operating knob 148 and rotating same to bring the movable wire-forming tool 150 into the position of Fig. 10. The resulting configuration of the contact part c is best seen in Fig. 11, wherein the contact part c is formed with a predominant bend or hook d. Upon release of the knob 148, the turret bar is again indexed to bring the laterally off-set contact part c of the heater H into a work position relative to the tab-applying and welding station 18. At this station a tab member T, preformed as shown in Fig. 14, is placed manually in the groove on lower clamping and welding jaw 168 and in position to encircle the adjacent end of the heater wire, as seen in Fig. 14. Rotation of the shaft 162 brings the rockable clamping and welding jaw 166 into the position of Fig. 13 bending the tab over the wire. In this position, welding current through the electrodes welds the tabs to the hook end d of the heater wire. The tab member not only forms a contact member for the heater wire h but also braces the heater assembly and imparts additional strength thereto. Upon completion of the operations on one terminal end of the heater H, the positioning pin 38 is displaced upwardly to permit the chuck 26 to be turned end for end, and again latched in position whereupon the other end of the heater is located for processing. The described operation is again carried out in substantially the aforesaid manner to complete the tabbing of the heater H. Alternatively, the heater chuck may be rotated at each station so that the same operation may be performed on each end of the heater before the chuck is indexed to the next work station. Upon completion and prior to insertion within a cathode sleeve, the insulating layers 1, 1' and mandrel wire m, are preferably broken at a location substantially midway the ends of the heater to permit the latter to be folded into two rod-like portions in adjacent parallel relation with the tabbing members T, T' located adjacent the same ends of the assembly.

What is claimed as our invention is:

1. The process of tabbing heaters of the type including a heater wire wound on a mandrel wire and embedded between insulating layers comprising the steps of axially pulling said heater wire from between said insulating layers to provide an exposed contact part extending longitudinally of and projecting beyond said mandrel wire, laterally bending said contact part relative to the assembly of said mandrel and heater wires and adjacent the terminal end of said assembly, mounting a tab member on said assembly so as to embrace and engage said terminal end and said contact part of said heater wire.

2. The process of tabbing heaters of the type including a heater wire wound on a mandrel wire and embedded between insulating layers comprising the steps of pulling the terminal ends of said heater wire from between said insulating layers to provide exposed contact parts projecting from opposite ends of the assembly of said heater and mandrel wires, laterally offsetting said contact parts relative to said terminal ends of said assembly, encircling the opposite ends of said assembly with transversely extending tab members, and electrically connecting said tab members to the adjacent contact parts of said heater wire.

3. The process of tabbing heaters of the type including an elongated helical winding of heater wire embedded between insulating layers comprising the steps of axially pulling a terminal end of said winding from between said insulating layers to provide a contact part, cutting said contact part to a prescribed length, bending said formed contact part to laterally extend the same relative to said insulated winding, forming a U-shaped bend in said contact part, encircling said insulated winding with a tabbing member having laterally extending extremities arranged to sandwich and engage said bend therebetween, and securing said laterally extending extremities of said tab member to said contact part.

4. The process of tabbing heaters of the type including an elongated helical winding of heater wire embedded between insulating layers comprising the steps of longitudinally pulling several turns of said winding from between said insulating layers to provide an exposed contact part, cutting said contact part to a prescribed length, laterally extending said part relative to said winding, forming a U-shaped bend in said laterally extending part, encircling said winding with a member having laterally extending extremities, arranging said laterally-extending extremities to sandwich and engage said bent therebetween, and conductively connecting said laterally extending extremities of said tab member to said contact part.

5. The process of tabbing heaters of the type including an elongated helical winding of heater wire embedded between insulating layers comprising the steps of pulling the opposite ends of said winding from between said insulating layers to provide exposed contact parts, cutting said contact parts to prescribed lengths, bending said contact parts to laterally offset the respective contact parts relative to said winding, forming a U-shaped bend in each of said contact parts, encircling said opposite ends of said winding with tab members each having laterally extending extremities arranged to sandwich the adjacent U-shaped bend therebetween, and conductively connecting the laterally extending extremities of the respective tab members to the adjacent contact part.

6. The process of manufacturing heaters comprising the steps of coating a support with a layer of refractory material, helically winding on the coated support a desired length of heater wire, coating the wound heater wire with a layer of fragile refractory material to form a heater assembly, pulling several turns of said heater wire from between the refractory layers to provide an exposed contact part, bending said contact part to extend at substantially a right angle to said assembly, mounting a tab member on the assembly with opposite end portions of said tab member underlying and overlying said contact part, and conductively connecting the opposite end portions of said tab member to said contact part.

7. The process of manufacturing heaters comprising the steps of coating a mandrel wire with a layer of refractory material, helically winding on the coated mandrel wire a desired length of heater wire, coating the wound heater wire with a further layer of fragile refractory material, to form a heater assembly, pulling a terminal end of said heater wire from between the refractory layers to provide an exposed contact part, cutting said exposed contact part to a prescribed length projecting substantially axially of and beyond the wound heater wire, bending said contact part to extend at substantially a right angle to the assembly, forming said contact part with an offset portion, mounting a tab member on the coated assembly with opposite end portions of the tab member underlying and overlying contact part, including the offset portion, and conductively connecting the opposite end portions of said tab member to at least said offset portion of said contact part.

8. The process of manufacturing heaters comprising the steps of coating a mandrel wire with a layer of refractory material, helically winding on the coated mandrel wire a desired length of heater wire, coating the wound heater wire with a layer of fragile refractory material forming a heater assembly, pulling opposite terminal end parts of said heater wire from between the refractory layers, cutting said terminal end parts to prescribed lengths, each projecting substantially axially of and beyond the assembly, forming said terminal end parts with offset portions, bending the terminal end parts to bring said offset portions into substantially side by side relation with the assembly, adjacent the opposite ends of the assembly, mounting tab members on said opposite ends of the assembly, conductively connecting the respective tab members to at least the offset portions of adjacent contact parts, said tab members extending in opposite directions, and nicking and breaking the refractory layers and the mandrel wire only at a point substantially midway between said opposite ends of the assembly and bending the assembly to bring the tab ends together.

9. The process of tabbing heaters of the type including an assembly of a heater wire wound in a single layer on a mandrel wire with the wire embedded between insulating layers, comprising the steps of pulling both terminal ends of said heater wire from between said insulating layers to provide exposed contact parts, laterally bending said contact parts relative to said terminal ends of said heater wire, mounting a tab member on each end of the assembly provided by the insulated and wound heater wire, and electrically connecting said tab members to said contact parts of said heater wire.

References Cited in the file of this patent

UNITED STATES PATENTS

| | | |
|---|---|---|
| 1,400,038 | Egerton | Dec. 13, 1921 |
| 1,431,158 | Heany | Oct. 10, 1922 |
| 1,836,948 | Anderson | Dec. 15, 1931 |
| 2,145,186 | Meeker et al. | Jan. 24, 1939 |
| 2,247,869 | Beers | July 1, 1941 |
| 2,258,836 | Willner | Oct. 14, 1941 |
| 2,479,556 | Chanowitz | Aug. 23, 1949 |
| 2,528,425 | Corson | Oct. 31, 1950 |
| 2,537,061 | Kohring | Jan. 9, 1951 |
| 2,545,352 | Gibbs | Mar. 13, 1951 |
| 2,557,571 | Siegel | June 19, 1951 |
| 2,564,874 | Andren | Aug. 21, 1951 |
| 2,565,599 | Elliott | Aug. 28, 1951 |
| 2,589,521 | Wheeler | Mar. 18, 1952 |
| 2,589,522 | Wheeler | Mar. 18, 1952 |
| 2,590,904 | Titus et al. | Apr. 1, 1952 |
| 2,596,325 | Cerny | May 13, 1952 |
| 2,606,955 | Herrick | Aug. 12, 1952 |
| 2,618,839 | Morrell | Nov. 25, 1952 |
| 2,623,145 | Upton | Dec. 23, 1952 |
| 2,738,481 | Mautone | Mar. 13, 1956 |